April 30, 1963 C. E. QUIGLEY 3,088,079
GATED CLOCK CIRCUIT
Filed Dec. 30, 1960
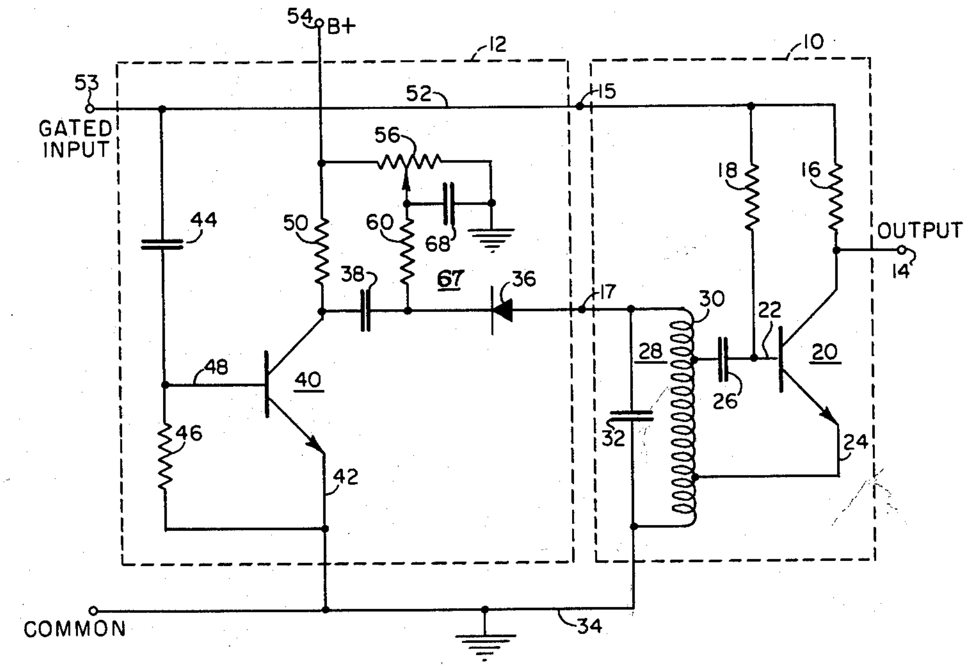
INVENTOR
CHARLES E. QUIGLEY
BY John E. Kidd AGENT
Richard Reed ATTORNEY United States Patent Office 3,088,079
Patented Apr. 30, 1963

3,088,079

GATED CLOCK CIRCUIT

Charles E. Quigley, Hyattsville, Md., assignor to the United States of America as represented by the Secretary of the Navy Filed Dec. 30, 1960, Ser. No. 79,933
1 Claim. (Cl. 331—174)
(Granted under Title 35, U.S. Code (1952), sec. 266)

The invention described herein may be manufactured and used by or for the Government of the United States of America for governmental purposes without the payment of any royalties thereon or therefor.

The present invention relates generally to a method of generating and controlling pulsed electrical energy and more particularly to a gated clock circuit capable of generating accurately spaced and extremely narrow timing pulses of randomly spaced pulse trains while remaining comparatively insensitive to variations in characteristics of the gating and generating circuits.

There has long been a need for an efficient clock circuit generating trains of accurately spaced pulses, such that, the time period between the instant of commencement of neighboring trains is capable of continuous variation or that in general would bear no relation to the pulse to pulse spacing that occurs within a train. Such a train must be capable of being as long as one may desire and be able to vary in train length from train to train without degrading the timing accuracy or starting time characteristics of the clock circuit. In the past, the methods used to accomplish these results are principally three in nature, exemplified by the free-running oscillator with gated countdown circuits, the gate excited lamped wave oscillator and the pulse excited damped wave oscillator. The first system, the free-running oscillator consists of a highly stable oscillator having a period of oscillation of $t$ seconds and a countdown circuit having a countdown ratio of N to 1, wherein the gating function is performed as a function of the countdown circuit. But in order to reduce the time jitter in the starting time of this circuit, which is at best $+t$ seconds, it is necessary to build a stable oscillator operating at many times the desired period between successive output pulses $tN$ so that $t$ will be sufficiently small. This requires the use of a countdown circuit in which N, the countdown ratio, may commonly be relatively large, requiring the use of a larger number of stages. Basically, this circuit is not well suited to systems in which space and circuit complexity is a necessary factor due to the complicated countdown required and secondly, it requires circuit elements capable of operating at many times the desired output frequency in order to obtain a starting time jitter which is satisfactorily small.

The gated excited damped wave oscillator, in its simplest form consists of a clamp circuit and a high Q tuned circuit. A common form of clamp circuit might be an electron tube connected as a cathode follower such that the tuned circuit appears between the cathode and ground. The high Q tuned circuit commonly consists of a frequency selective network and a feedback amplifier such that the net loop gain of the circuit is unity when the clamp tube is inoperative. Due to various effects, a finite length of time, often several cycles of the output signal, must elapse before the circuit achieves a condition of stable oscillation, consequently, timing accuracy commencing with the first output pulse of the gated train is sacrificed due to poor starting characteristics of the oscillator.

The pulse excited damped wave oscillator consists essentially of a high Q tuned circuit and a pulse source coupled to the tuned circuit by means of a diode. As in the example of the gate excited damped wave oscillator, the tuned circuit consists of a frequency selective network and a feedback amplifier, however, here the amplifier is designed such that the net loop gain approaches, but is less than unity.

Due to circuit characteristics, the waveforms appearing on what would be the equivalent of the grid and cathode of the oscillator are not of similar shape so that there is no point of symmetry between the positive portion and negative portion half cycles of the output waveform. Generally speaking, the starting time is relatively fast; however, the output waveform never truly stabilizes, so that there is no one d.c. potential which can be used as a trigger threshold for subsequent circuits at which the timing is truly accurate. The decay in the waveform also effects the maximum length of a train of timing pulses for any particular choice of circuit constants.

The circuit described herein has the advantage that pulse to pulse timing within a train, starting with the first pulse, is accurate to within a small percentage of the pulse to pulse period of the output and is capable of the same stability in starting time at any given supply voltage. This is true while only using circuit elements capable of operation at frequencies only slightly higher than the frequency represented by the width of the desired output pulses. In this circuit, equivalent results are obtained with a lesser number of component parts, yet no adverse effects as a result of the new arrangement are experienced.

It is an object of this invention therefor to provide a stable gated clock circuit capable of generating accurately spaced pulses in varying train lengths over a wide range of input supply voltage.

It is another object to provide a gated clock circuit having the same stability in starting time at any given supply voltage, while at the same time the accuracy is maintained independent of the loading of the output circuit and independent of the gating circuit.

A further object is to provide a gated clock circuit wherein the starting characteristics of the output signal are insensitive to the line voltage, principally in the amplitude and width of the first pulse generated as well as the overall period and amplitude of all other output pulses.

It is yet another object to provide an output pulse waveform whose width is extremely narrow compared with the period of pulse repetition and still retaining comparative simplicity in circuit design.

Still another object is to provide a circuit for use in the generation and manipulation of accurately spaced pulses occurring in non-coherently spaced pulse trains where the spacing between adjacent pulse trains may be used to communicate additional information.

Other objects and advantages of the invention will hereinafter become more fully apparent from the following description of the accompanying drawing, wherein there is shown a schematic circuit diagram of one embodiment of a gated clock circuit in accordance with the principles of my invention.

Referring now to the drawing, the gated clock circuit is composed basically of a timing oscillator circuit 10 and a gating circuit 12. The timing oscillator comprises a tuning circuit 28 coupled to an NPN transistor 20, thereby forming a class C type base-emitter oscillator. Tuning circuit 28 is connected to a excitation potential terminal 17 at its upper end and at its other end to a common reference point 34 negatively biased with respect to the excitation potential terminal 17. Tuning circuit 28 is composed of a high Q inductance coil 30 and a capacitor 32 whose value is chosen so as to resonate with the inductance at the desired output frequency. The signal developed across tuning circuit 28 is coupled to the transistor 20 through a long time constant circuit consisting of capacitor 26 and resistor 18, to the base 22 of the transistor. Resistor 18 is chosen so as to bias transistor 20 slightly into conduction by being connected to an input reference potential at point 15. A resistor 16 is also connected to point 15 and to the collector of transistor 20 to develop the output signal which is taken from the collector at output terminal 14.

The inductance of coil 30 is chosen so that the lower tap connected to emitter 24 can be well down the coil and still comprise sufficient inductance between the tapping point and the common reference point 34 to support the widest current pulse fed back to the coil by emitter 24. The Q of coil 30 is chosen to provide the desired output width, usually a Q greater than 25, to ensure relative insensitivity of the output frequency to the loading of the output circuit. The upper tap is chosen so that the transformer ratio between the upper and lower tap with respect to ground is greater than the minimum current amplification factor to be expected from the remainder of timing oscillator 10.

The gating circuit 12 of the invention includes a transistor 40 connected in a common emitter amplifier configuration with its input or base-emitter circuit connected across input terminal 53 and a common reference point 34. As shown, the emitter electrode 42 is connected to ground and the base electrode biased just at cut-off, is connected to input terminal 53 by means of a differentiating network. The differentiating network composed of capacitor 44 and resistance 46 receives a fast rise time gated input signal, differentiates the leading edge and applies the resulting spike to the base electrode 48. The transistor 40 collector is connected to power supply 54 through collector load resistor 50. The value of the load resistance is determined primarily by the maximum pulse width acceptable at the output of transistor 40. The output or emitter-collector circuit of transistor 40 is coupled to the tuned circuit 28 of timing oscillator 10 by means of an A.C. coupled clipping circuit 67.

The configuration of the A.C. coupling circuit is designed to allow a new voltage level to be established for the spike signal generated at the collector electrode of transistor 40 thereby providing an excitation pulse at terminal 17 that is relatively unaffected by variation of the supply potential. As shown in the circuit diagram, a pulse voltage appearing at the collector of transistor 40 is coupled by capacitor 38 to the cathode of diode 36. The anode of diode 36 is connected directly to the tuned circuit 28 at terminal 17. Diode 36 is normally biased positively by a fraction of the applied supply voltage at 54. Condenser 68 is chosen sufficiently large to bypass the slider arm of variable impedance 56, while resistor 69 is chosen so that the resulting spike from transistor 40 is lightly loaded.

Considering first the operation of the timing oscillator, it is to be assumed that the circuit is in steady state oscillation. For this purpose the input terminal 15, may be considered instead of as shown as being connected to a D.C. supply voltage of the same potential as the amplitude of the gated input signal. The excitation reference terminal 17 may then be considered as disconnected from gating circuit 12.

With the oscillator in steady state oscillation, the signal appearing across the tuned circuit 28 observed at point 17, is essentially a sinusoid waveform. The tuned circuit is of sufficiently high Q so that very little energy is lost within a cycle and the energy that is lost is restored during the small portion of each cycle that transistor 20 is driven into conduction. For a sufficiently high Q of the tuned circuit 28, the maximum amplitude of voltage appearing at terminal point 17 is directly proportional to the amplitude of the current pulse supplied by the emitter of transistor 20, as well as being a function of the $L/C$ ratio and Q of the tuned circuit. A portion of the sinusoid waveform is coupled through the time constant network 26 and 18 to the base electrode 22 of transistor 20.

On the positive half cycle of the potential waveform appearing at terminal 17, as soon as the potential of the upper tap becomes sufficiently positive with respect to the lower tap of the coil, transistor 20 will commence to conduct. Due to the conduction in the base to emitter junction of transistor 20, for prior cycles of oscillation, condenser 26 is charged and the base 22 is slightly negative with respect to the upper tap of coil 30. As a result, the potential of the upper tap with respect to the lower tap of the coil must become sufficiently positive to overcome the potential difference stored in condenser 26 before transistor 20 commences to conduct.

As terminal 17 becomes more positive, the base 22 of transistor 20 is driven further into conduction, so that the base to emitter resistance decreases, thereby causing condenser 26 to become further charged. Due to the flywheel effect of the tuned circuit and the transformer action of coil 30, the potential waveform of the upper tap with respect to the lower tap of the coil is essentially a sinusoid so that the potential difference increases at a steadily decreasing rate. As the base-emitter resistance decreases with increasing base current, the potential difference increases at a rate slower than the rate of charging of condenser 26. As a result, there is no further increase in base current of transistor 20 and hence no further feedback current into the lower tap.

The potential of terminal 17 continues to increase to a maximum determined by the maximum current supplied by the emitter of transistor 20 and then decreases to some potential at which transistor 20 no longer conducts. Again, because of the flywheel effect of the tuned circuit 28, this potential drops to zero, increases to a maximum negative potential, then rises to zero. The cycle is then repeated. The time constant of condenser 26 and resistor 18 is quite long compared to the period of oscillation, so that very little charge stored in condenser 26 during one conduction period is lost in the remaining portion of the cycle when transistor 20 is no longer conducting.

The period of conduction of transistor 20 is a function of the period of time between the instant the potential difference between the coil taps becomes sufficiently positive to overcome the potential due to the charge stored in condenser 26 and the instant the base-emitter resistance becomes sufficiently small that any further increase in the potential difference between the two coil taps is lost in charging condenser 26. The higher the Q of the tuned circuit 28, the smaller this conduction period will be and the smaller the conduction period can be made, the more accurate the frequency of oscillation of circuit 28. As a result, the pulse to pulse spacing of the output waveform becomes independent of the other circuit constants.

The period required before steady state oscillation is established is a function of the Q of the tuned circuit, the current gain of the transistor and the time constant of 26 and the base-emitter resistance when transistor 20 is conducting as compared with the time constant of condenser 26 and bias resistor 18 when transistor 20 is at cut-off.

In order that the period required may be made very small (less than 1 cycle) before steady state oscillation is established, two conditions must be satisfied. First, the choice of condenser 26 must be such that its time constant, including the expected base-emitter resistance when transistor 20 is conducting, should not be greater than the expected output pulse width of the oscillator, thus allowing condenser 26 to become fully charged within the first cycle or two of oscillation. Second, an additional means must be provided to excite the tuned circuit 28 into oscillation at the proper amplitude corresponding to the amplitude of the applied input signal. The power supply voltage, originally used in the oscillator circuit can be replaced by a fast rise-time gated input signal such as the gated input signal at 53. However, due principally to the high Q of the tuned circuit, the mere application of the gated signal alone will result in an extremely long starting time for the oscillator 20. As a result, an excitation pulse is also supplied to tuned circuit 28, to shock excite the tuned circuit into full oscillation. This second condition is met by means of the output of gating circuit 12 being applied to terminal 17.

Considering now the operation of the gating circuit 12, the same fast rise-time gated input signal applied to terminal 15 of oscillator 10 is also applied to the base 48 of transistor 40, causing a narrow negative excitation pulse to be developed at terminal 17. The pulse is developed by differentiating the leading edge of the fast rise-time gate signal, amplifying and inverting the resulting spike and subtracting this pulse from an adjustable D.C. bias by means of a biased clipping circuit.

The input differentiating circuit consisting of condenser 44 and base return resistor 46, differentiates the fast rise-time leading edge of the input signal, producing a narrow pulse which is fed to the input of the amplifier inverter 40. In order that the oscillator 10, driven by the output of the gating circuit, be capable of starting quickly, the width of the output signal from the differentiating circuit should be somewhat less than ¼ the period of oscillation of the tuned circuit 28. As a result, not only must the gated input signal be correspondingly fast but also the time constant of 44 and 46 must be comparably small. In order that the output pulse amplitude of the gating circuit be sufficiently large to drive the tuned circuit to the full amplitude of oscillation on the first half cycle, the gated input amplitude and the current delivering capabilities of the differentiating circuit must be sufficient to drive transistor 40 almost into full saturation. Consequently, resistance 46 should be slightly larger than the base-emitter resistance of transistor 40 when driven into full saturation. Hence resistor 46 will normally range between 500 and 2500 ohms and capacitor 44 being approximately 100 pf. for an oscillator frequency of 1.35 mc.

Operation of the inverting amplifier 40 is generally similar to any common emitter pulse amplifier whose base is biased just at cut-off. The only exception is that the operation of the amplifier is such that the input pulse peaks drive the transistor into a region approaching saturation.

In general, the amplitude of the output signal from the transistor 40 can never exceed the applied D.C. supply voltage. In fact, the maximum output signal amplitude will be somewhat less than the supply voltage, how much less being determined by the voltage dividing action of the transistor collector saturation resistance and the collector load resistance 50. Consequently, until full saturation of transistor 40, the output signal is substantially effected by the value and linearity of the supply voltage.

The nature of the operation of this gating circuit is such that the effect of variation of the supply voltage on the output signal amplitude of the inverting amplifier 41 will be just compensated for by the effect of supply voltage variation on the A.C. coupled clipping circuit 67.

As shown in the schematic diagram, the negative pulse spike appearing at the collector of amplifier inverter 40 is A.C. coupled to the cathode of diode 36, which has been biased positive over some fraction of the applied supply voltage 54. Condenser 68 is chosen sufficiently large to bypass the slider arm of potentiometer 56 to ground and ranges commonly from .01 mfd. on up. Resistor 60 is made sufficiently large (over 50 kilohms) so that the input pulse to diode 36 will be lightly loaded. The time constant of condenser 38 and resistance 60 is somewhat larger than the width of the input pulse from the inverting amplifier so that 38 may be commonly .001 mfd. or larger.

The function of the A.C. coupled clipping circuit is to subtract a D.C. bias which varies linearly with respect to the supply voltage from a negative going pulse spike whose amplitude also varies with respect to the supply voltage, thereby causing only the uppermost portion of the differentiated leading edge of the gated input signal to appear as an excitation pulse at terminal 17. Diode 36 is connected so that it will only conduct whenever the cathode is negative with respect to the anode. Once the diode 36 conducts, terminal 17 is forced negative to a voltage equal to the peak amplitude of the spike measured with respect to ground that is developed by transistor 40. Once the peak of the spike has been reached and the waveform at the cathode commences to return to some positive potential, diode 36 decouples, due to the much slower time constant of the tuning circuit. Hence, the D.C. level adjustment by potentiometer 56 acts to set the effective amplitude of the spike which first energizes the tuned circuit 28. Once the leading edge of the input gate signal has passed, the diode remains biased with a sufficient D.C. cut-off bias to prevent any further interaction between the gating circuit and the timing oscillator for the remaining portion of the cycle. The circuit parameters are chosen such that the excitation pulse appearing at terminal 17 is quite small compared with the bias voltage appearing across load resistor 60. Accordingly, once the instantaneous potential of the cathode of diode 36 increases to the positive bias potential, the diode remains biased beyond cut-off for the remainder of the oscillation cycle of tuned circuit 28. As a result, once the initial excitation of the tuned circuit 28 has been achieved, the gating circuit connection at terminal 17 has no further effect either on the amplitude or the frequency of oscillation.

In this circuit, the tuned circuit is excited into the negative half-cycle and has approximately half the oscillation period to dispose of any starting transients before initiating the first output pulse. Additional changes in amplitude and period for the next several cycles is eliminated at any given D.C. supply voltage to the gating circuit by adjusting potentiometer 56.

An inherent advantage of this method of starting the oscillator is the relative insensitivity, principally of the amplitude and width of the first pulse generated, to the D.C. supply voltage, assuming the input gate signal is maintained relatively constant. As the D.C. supply voltage 54 increases, the increase in negative pulse amplitude of the spike developed by transistor 40 is just offset by the change of voltage across potentiometer 56. Accordingly, the excitation pulse at terminal 17 is maintained approximately constant over a wide range of supply voltage.

For any given transistor and for any given choice of the collector load resistance, an adjustment of potentiometer 56 can be found which will give the necessary amplitude of the gate which is applied directly through input terminal 15 of the timing oscillator. Any new set of parameters and adjustments will result in a slightly different range of supply voltage over which the amplitude of the excitation pulse at terminal 17 will remain relatively constant.

It should be appreciated that while transistor circuits employing NPN transistors have been shown, the principles could be equally true of PNP type transistor circuits, as well as tube type versions of both circuits.

It should be understood of course that the foregoing disclosure relates to only a preferred embodiment of the invention and that numerous modifications or alterations may be made therein without departing from the spirit and scope of the invention as set forth in the appended claim.

What is claimed is:

A gated clock circuit for providing a coherent series of pulses during a period of time having recurrence periodicity subject to variation comprising, an oscillator including an active element with electrodes, means for applying a power pulse to said oscillator to provide the energizing potential for the electrodes of the active element of the oscillator, means for differentiating said power pulse to derive a short duration spike signal at the start of each period of time, means for applying said spike to said oscillator to provide substantial enhancement of the oscillator activity at the start of each period of time to compensate for starting inertia of the oscillator, means for blocking said last named means in the intervals between spikes, and means for controlling the level of the spikes applied to said oscillator whereby a selected compensation is attained to provide uniform oscillation amplitude during the period of time.

References Cited in the file of this patent

UNITED STATES PATENTS 2,476,997 Noyes ---------------- July 26, 1949

2,743,363 Mautner et al. ---------- Apr. 24, 1956